United States Patent [19]

Ruben

[11] 4,074,030

[45] Feb. 14, 1978

[54] PROCESS FOR PRODUCING NICKEL OXIDE CATHODIC REACTANT FOR PRIMARY CELLS

[76] Inventor: Samuel Ruben, 52 Seacord Road, New Rochelle, N.Y. 10801

[21] Appl. No.: 743,510

[22] Filed: Nov. 19, 1976

[51] Int. Cl.$^2$ ............................................. H01M 4/32
[52] U.S. Cl. ..................................... 429/223; 204/2.1; 204/61; 204/96
[58] Field of Search ................... 429/223; 204/61, 96, 204/2.1

[56] References Cited

U.S. PATENT DOCUMENTS 3,997,364  12/1976  Gutridge ............................... 204/2.1

*Primary Examiner*—Charles F. LeFevour

[57] ABSTRACT

A process for producing a high coulombic capacity nickel oxide cathodic reactant or depolarizer for primary electric cells. The process includes the steps of growing large nickel oxide dendrites on the exterior surface of a suitable base, converting the dendrites to a higher oxide of nickel, which is then removed from the base and ground to small particles for use as a cathodic reactant or depolarizer.

5 Claims, No Drawings

PROCESS FOR PRODUCING NICKEL OXIDE CATHODIC REACTANT FOR PRIMARY CELLS

The invention relates to a process for producing a cathodic reactant or depolarizer for electric current producing cells. Specifically, it relates to a process for producing a cathodic material of nickel oxide that has a higher coulombic capacity per unit volume and lower electric resistance than that used in available nickel oxide cells. The cathodic material produced by the process is itself highly conductive, not requiring the addition or use of metals or carbon to provide conductivity.

The general object of the invention is the provision of a method for producing an improved nickel oxide reactant.

A specific object is the provision of a method for producing nickel oxide reactant having a higher coulombic capacity per unit volume than nickel oxide reactants previously produced or available, and being itself highly conductive as distinguished from presently used or available nickel oxide reactants.

A further object is the provision of a method for producing a nickel oxide reactant particularly suitable for use as the depolarizer in primary dry cells.

Other objects will be apparent as the disclosure proceeds.

Nickel oxide cathodes have been made by a number of processes. In one process, a sintered nickel plaque is impregnated with a nickel nitrate solution and solid nickel hydroxide chemically precipitated with a solution of sodium hydroxide. The plaques are subsequently converted into the active hydroxide. The presence of the sintered nickel is essential to provide electrical conductivity.

In another process, an electrode frame body of porous sintered nickel powder is connected as a cathode in an electrolytic bath comprising an aqueous solution of nickel nitrate, with a foil of nickel serving as the anode. The electrolysis is carried out for a period of time until the pores of the frame body are filled with bivalent nickel hydroxide. Subsequently, the electrode is connected as the anode in an alkaline solution and the bivalent nickel hydroxide converted into trivalent nickel hydroxide. The presence of the sintered nickel is essential to provide electrical conductivity.

In a somewhat similar electro-precipitation process, a flexible, expansible nickel plaque composed of sintered nickel fibres having a plaque porosity between 75 and 95 percent is cathodically impregnated with a solution comprising nickel nitrate to produce a deposition of Ni(OH)2, the plaque being then anodized in an alkaline solution. The presence of the nickel fibres is essential to provide electrical conductivity.

In another process, a porous nickel frame is cathodically impregnated by immersing the nickel frame in a molten (100° C) nickel nitrate hydrate electrolyte. The electrolyte is maintained acidic by adding nitric acid and the bath is maintained at a pH of about 0.1. The presence of the nickel is essential to provide electrical conductivity.

In my invention, the cathodic reactant is made of a lower electrical resistance base of nickel hydroxide of high conductivity, not requiring the addition of another electrical conductor, such as graphite, carbon or nickel powder. When compacted under high pressure into a pellet or other form for assembly into a primary cell container, a small amount of carbon or graphite is added, solely for bonding purposes and to insure uniform electrolyte contact and content throughout the cathode mass. The electrical conductivity of the material of this invention is higher than that of graphite or carbon.

The process which I have devised and which I use for producing small quantities of material is as follows:

CATHODIZATION

A dry mixture of 90 parts by weight of $Ni(NO_3)_2.6H_2O$ and 10 parts by weight of $Co(NO_3)_2.6H_2O$ is heated to liquification in a water bath, brought to 90° C, and maintained at this temperature.

Using a 600cc Pyrex beaker containing 500cc of the above molten mixture, two 0.030 inch thick Ni strips 1¾ inches wide positioned 2½ inches apart are connected as positive electrodes; a 2¾ inches wide piece of 14 × 14 mesh screen formed from 0.020 inch Ni wire is immersed to a depth of 3½ inches midway between the other two electrodes, and connected as the negative electrode. A current of 2 amperes is applied for 4 hours, or a total of 8 ampere hours. An output of approximately 2.0 grams of green $Ni(OH)_2$ dendrites per ampere hour is obtained, the dendrites being about    inch in length. The dendrites extend outward from the exterior surface of the 9.625 square inch nickel screen.

ANODIZATION

After cathodization, the nickel screen carrying the dendritic formation of green $Ni(OH)_2$ is withdrawn from the molten bath, rinsed in hot tap water, and immersed in an aqueous 20/100 LiOH bath with a 2 ampere current again being applied. In this step, the dendrite coated nickel screen is connected as the positive electrode and two ⅜ inch wide Ni strips connected as the negative electrode. A 2 ampere current is applied overnight (approximately 19 hours for a total of 38 AH). The following day a five cycle procedure of reversing polarity is applied as follows: The 2 ampere current is reversed, the dendrite coated Ni screen becoming the negative electrode for 20 minutes, the screen being then connected as the positive electrode for 20 minutes, this cycle being repeated five times, the final cycle with the screen connected as the positive electrode being maintained for 1 full hour. The $Ni(OH)_2$ dendrite coated Ni mesh is then removed from the LiOH bath and rinsed in hot tap water.

The use of a lithium hydroxide electrolyte in the anodization procedure results in better distribution of current, thus providing a more uniform oxidation of the $Ni(OH)_2$ than that obtainable with the sodium or potassium hydroxide electrolytes used in the prior act.

The dendrites after oxidation to maximum oxygen valency state by the above step, are hard, dense, friable and readily brushed off the surface of the screen on which they have been formed. After drying, they are micronized or ground to a fine state. The high current density obtained by carrying out the process on the nickel screen, is responsible to a great extent for the low electrical resistance and friable state of the dendrite.

For use as a cathode in primary cells, the oxidized dendrite powder is mixed with 5% of graphite or carbon, serving as a binder, and compressed under high pressure into a pellet. The pellet is then assembled with a zinc or cadmium anode, an absorbent spacer between the electrodes, an alkaline electrolyte and a container, to provide an efficient primary cell.

The cathode of this invention is usable in conventional structure alkaline primary cells employing zinc or cadmium anodes and alkaline electrolytes.

Primary cells embodying the cathode and having an open circuit voltage of 1.7 may be used to replace the more expensive silver oxide alkaline cells, the open circuit voltage of which is 1.56. The cathode may also be used in some types of rechargeable cells.

I claim:

1. A process for producing a highly electrically conductive high coulombic capacity nickel oxide cathodic reactant for electric current producing cells which comprises making a metal screen the cathode in a molten nickel nitrate electrolyte, applying adequate electric current for a sufficient length of time to produce large nickel hydroxide dendrites on the exterior surface of said screen and extending outwardly therefrom, washing said dendrites and screen, connecting said dendrite bearing screen as the anode in an aqueous alkaline electrolyte, applying current thereto to convert the oxide dendrites on said screen to a friable hard dense higher oxide of nickel easily brushable off said screen, washing said screen and dendrites, and removing said dendrites from said screen base.

2. The process set forth in Claim 1 characterized in that the aqueous alkaline electrolyte is lithium hydroxide.

3. The process set forth in Claim 1 characterized in that after removal of the dendrites from the screen base, the dendrites are ground to small particle size.

4. The process set forth in Claim 1 characterized in that after removal of the dendrites from the screen base, the dendrites are ground to small particle size, a minor amount of binder being added, and compacted under high pressure to form a cathodic reactant element.

5. A nickel oxide cathodic reactant element for electric current producing cells made according to the process set forth in Claim 1.

* * * * *